United States Patent [19]
Sangster et al.

[11] 3,719,926
[45] March 6, 1973

[54] TAPE PROGRAM CONTROL

[75] Inventors: Arlon G. Sangster; Charles B. Pickering, both of Sterling; Thomas J. McNamara, Auburn, all of Mass.

[73] Assignee: Jamesbury Corp., Worcester, Mass.

[22] Filed: March 1, 1971

[21] Appl. No.: 119,888

Related U.S. Application Data

[63] Continuation of Ser. No. 783,866, Dec. 16, 1968, abandoned.

[52] U.S. Cl..........340/147 P, 235/61.11 R, 318/569, 317/139
[51] Int. Cl................................................H04q 3/04
[58] Field of Search.........340/147 MT, 318/568, 570, 569; 235/61.11; 317/137, 139, 134

[56] References Cited

UNITED STATES PATENTS

| | | |
|---|---|---|
| 3,069,608 | 12/1962 | Forrester et al.....................318/570 |
| 3,414,787 | 12/1968 | Reuteler et al......................318/570 |
| 3,181,121 | 4/1965 | Losch et al........................340/147 P |

*Primary Examiner*—Thomas A. Robinson
*Attorney*—Shaffert & Miller

[57] ABSTRACT

A control device for sequential control of a process or machine which includes a means for reading perforated tape having thereon codes representative of alphabetic, numerical or any other symbols. The control includes means to interpret these codes and means to respond to these codes to either energize or de-energize a plurality of outputs, means to further condition the control to accept only selected input signals appearing on a plurality of input terminals, and means to operate the reading means only in response to a preselected input signal.

3 Claims, 3 Drawing Figures

```
/03
BGHMPV/04
g/05
hY/07
PIJ/09
yCEFNTUZ/11
etz/12
fnAKLX/13
krxTWZ/14
tuwz/15
amQ/16
Y/17
dL/19
ijS/20
s/21
qGH
```

INVENTORS
A. G. SANGSTER,
C. B. PICKERING,
T. J. McNAMARA

TAPE PROGRAM CONTROL

This application is a continuation of patent application Ser. No. 783,866, filed Dec. 16, 1968, titled TAPE PROGRAM CONTROL, now abandoned.

BACKGROUND OF THE INVENTION

In devices for the automatic control of cycles for operating and production machines such as machine tools, plastic molding machines, etc., a series of operations in exact sequence must be programmed. These operations typically consist of the functions of stopping and starting motors, energizing and deenergizing relays, solenoids and timers. The control of these functions is by an arrangement of relays interlocked and arranged to produce the required sequence of operations. The initiating signals are produced by the operation of push buttons, limit switches, contacts and similar means. The necessary arrangement of relays and switches is usually very complex and is very difficult to design. Due to the complexity of the general nature of the problem, such controls are de-bugged after actual assembly even when designed by engineers skilled in the art, and in many cases the control means has to be completely revised or at least gone over to make sure there are no breaks, when the control is actually used prior to its assembly at the place of production. Even then, there are malfunctions in some cases.

The object of the invention is to provide a new and improved method of controlling sequential events by means of a program coded on perforated tape. Since the interconnections and the relationship between the inputs and outputs is governed by the program on the punched tape, the control provides an extremely flexible and universal means of controlling a wide variety of operational cycles.

SUMMARY OF THE INVENTION

The present invention is directed to a device for sequentially controlling the energizing and deenergizing of various elements. A tape reader has connected thereto a plurality of inputs. Also connected to the tape reader are a plurality of outputs which are connected to the various elements which are to be energized and deenergized. A tape having various control signals recorded thereon is read by the tape reader in order to cause the energization of certain elements, the deenergization of other elements and the halting of the reading of the tape until a signal appears over a preselected input line. Thus, reading of the tape may sequentially energize element A, deenergize element B and halt the reading of the tape thereby preventing the generation of further energization and deenergization control signals until a signal appears on input line number one at which time further signals are read from the tape. Signals appearing on other than the preselected input line will not cause further signals to be read from the tape.

PREFERRED EMBODIMENT OF THE INVENTION

Figures 1, 2:
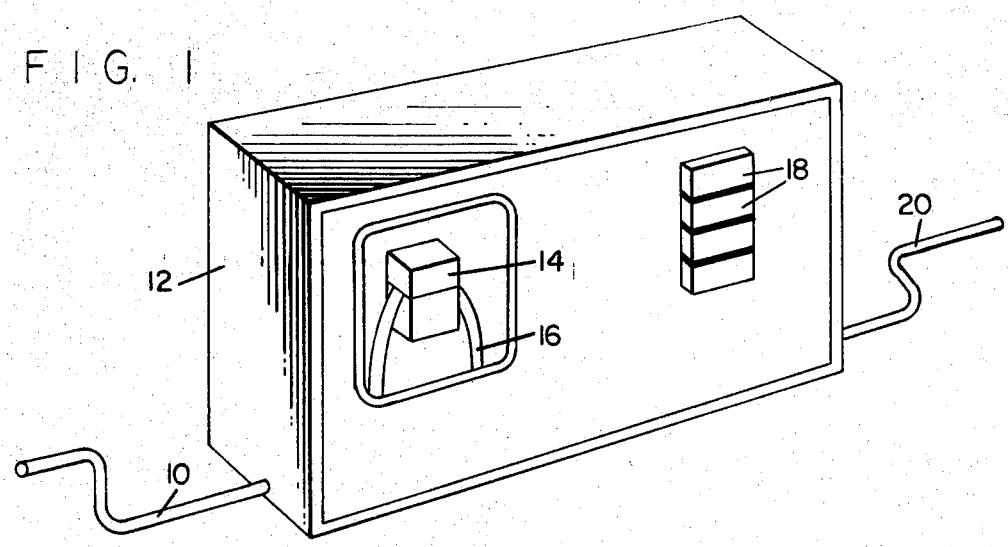
FIG. 1 is a perspective view illustrating the housing for the taped program control device.
FIG. 2 shows a sample program.

Referring to the drawings, the reference numeral 10 indicates a cable leading into the housing 12. The cable 10 may contain any number of input lines from what may be referred to as the primary electric actuators such as push buttons, limit switches, etc. In the housing 12 there is a tape reader or the like 14 for pre-programmed tape 16, and a series of energizing devices 18 which are controlled from the tape by the tape reader.

The reference numeral 20 indicates a cable which contains a series of output connections for what may be referred to as secondary electrical actuators, solenoids, etc., which actually run the machine in question.

In order to program a cycle, the steps of the cycle are numbered in chronological order and the required contact opening or closures at each step are indicated by the upper and lower case alphabetic characters A through Z (less I and O). An upper case A energizes a given output line while a lower case $a$ deenergizes that output line. A typical tape program would be as shown in FIG. 2. Present on the tape, but not printed on the manuscript, are "end-of-block" code at the end of each line and "upper case" and "lower case" codes which appear between changes from upper to lower case characters or vice-versa.

A typical block of characters would read as follows: (see line 8, FIG. 2). The lower case code (not shown but the first code in the block) would operate an internal circuit to open the contacts associated with the alphabetic characters immediately following; codes $f$ and $n$. (The upper case code (again not shown but located on the tape between $n$ and A) would operate an internal circuit to close the contacts associated with the alphabetic characters immediately following; codes AKLX.

The slash and the two following numerical codes open an electrical gate to allow the equipment to accept the initiate impulse next appearing on line 13. The end-of-block code (non-print on manuscript) stops the tape motion and terminates the block.

As illustrated, this block of information has opened a selected output group of contacts ($f$ and $n$), closed another selected output group of contacts (A, K, L and X) and armed the control to accept the next initiate signal appearing on line 13. Thus, the sequences of openings and closures can be either opened or closed in any timed relationship with any other contact.

Figure 3:
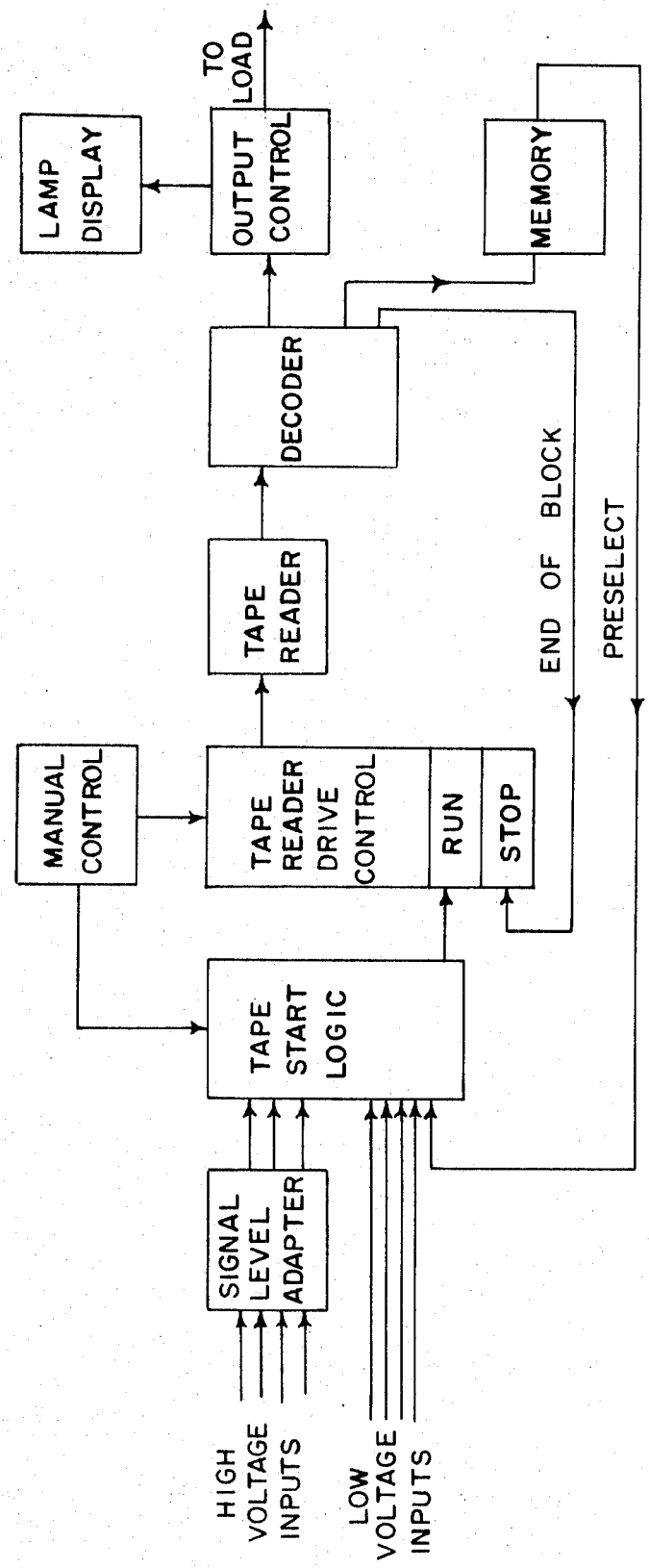
FIG. 3 is a block circuit diagram for the device.

With reference to the diagram, FIG. 3, the "tape start logic" will accept low voltage inputs directly or high voltage inputs indirectly through a "signal level adapter" which conditions the signal to low voltage into the "tape start logic."

The "Tape reader drive control" will either cause the reader to run or stop either manually when selected by an appropriate switch or:

1. Reader will run when the selected signal control (preselect line from memory) and the selected input signal is present.
2. Reader will stop when end of block signal is received from "Decoder"

The line from the "Manual Control" to "Tape Start Logic" indicates that the reader can be operated either one step or one block manually as selected by appropriate switches.

The "Tape Reader" is a reader adapted to operate from the necessary input signals and which will produce output signals from the tape.

The "Decoder" translates the tape hole signals into groupings representing various codes (numbers, letter, end of block, etc.) The output working signals (upper and lower case alphabetic characters) go to the "Output Control." The slash and preselect numerals go to the "memory" and the "end of block" code goes to the "Tape Reader Drive Control."

The "Output Control" goes to the loads being controlled turning on the loads indicated by upper case alphabetic characters, and turning off loads indicated by lower case alphabetic characters. The "Output control" also operates a lamp display indicating visually the on or off state of these loads.

The "memory" stores a one or more digit numerical value used to preselect the next acceptable input signal. As stated above, the tape reader generates output signals when an input signal appears on the preselected line.

It is believed that it will be seen that this invention provides the following novel advantages:

The invention provides for the application of a perforated tape as a program in combination with the input signals and the output energizers which are open or closed, according to the energize and deenergize control signals as delivered. Each input connection can be used over again in a single cycle as often as desired.

Furthermore, the tape blocks are programmed to accept only a certain predetermined signal from the input, and since it operates extremely fast, signals can be placed in proper sequence with veritable split-second timing for selection of output devices to be energized.

One of the novel devices herein can be installed as a master to control "slave" similar devices.

By the use of upper and lower case alphabetical characters to turn on and off selected load connections, see FIG. 2, a fool-proof very efficient as well as relatively simple tape controls a large number of operations with the least programming operations possible.

We claim:

1. Sequence control means for use with a storage member having control information stored therein for controlling the energization and deenergization of selected elements comprising means for retrieving said stored control information, a plurality of inputs connected to said retrieving means, a plurality of outputs connected to said retrieving means, means for generating an energizing signal on one of said plurality of outputs in response to retrieval of certain control information from said storage member, means for generating a deenergizing signal on said one of said plurality of outputs in response to retrieval of other control information from said storage member, means for preselecting one of said plurality of inputs in response to retrieving preselect control information from said storage member, means for inhibiting said retrieving means from further retrieval of information in response to the retrieval of said preselect control information from said storage member, and means for conditioning said retrieving means to be activated for further information retrieval by a signal over said preselected one of said plurality of inputs and not to be activated for such further retrieval by a signal over a non preselected one of said plurality of inputs.

2. Sequence control means for use with a record medium having control information recorded thereon for controlling the energization and deenergization of selected elements comprising means for reading said recorded control information, means for transporting said record medium past said reading means, a plurality of inputs connected to said transporting means, a plurality of outputs connected to said reading means, means for generating an energizing signal on one of said plurality of outputs in response to reading certain control information recorded on the record medium, means for generating a deenergizing signal on said one of said plurality of outputs in response to reading other control information recorded on said record medium, means for deactivating said transporting means in response to deactivation control information read from said record medium, means for preselecting one of said plurality of inputs in response to reading preselect control information recorded on said record medium, and means for conditioning said transporting means to be activated by a signal over said preselected one of said plurality of inputs and not to be activated by a signal over a non preselected one of said plurality of inputs.

3. Sequence control means for use with a record medium having control information recorded thereon for controlling the energization and deenergization of selected elements comprising means for reading said recorded control information, means for transporting said record medium past said reading means, a plurality of inputs connected to said transporting means, a plurality of outputs connected to said reading means, said recorded control information being representative of upper and lower case alphabetical letters, said recorded control information being further representative of numerical quantities, means for generating an energizing signal on one of said plurality of outputs in response to reading a predetermined letter in one or the other of its upper or lower case forms, means for generating a deenergizing signal on said one of said plurality of outputs in response to reading said predetermined letter in its other case form, means for deactivating said transporting means in response to reading a numerical quantity, means for preselecting one of said plurality of inputs in response to reading a preselect numerical quantity and means for conditioning said transporting means to be activated by a signal over said preselected one of said plurality of inputs and not to be activated by a signal over a non preselected one of said plurality of inputs.

* * * * *

UNITED STATES PATENT OFFICE
CERTIFICATE OF CORRECTION

Patent No. 3,719,926          Dated March 6, 1973

Inventor(s) Sangster et al.

It is certified that error appears in the above-identified patent and that said Letters Patent are hereby corrected as shown below:

Column 3, line 8:  add  --(/)-- after the word "slash"

Signed and sealed this 23rd day of April 1974.

(SEAL)
Attest:

EDWARD M.FLETCHER,JR.                C. MARSHALL DANN
Attesting Officer                    Commissioner of Patents FORM PO-1050 (10-69)                                    USCOMM-DC 60376-P69
                                          ☆ U.S. GOVERNMENT PRINTING OFFICE : 1969 O—366-334